United States Patent [19]
Bowen et al.

[11] 3,740,850
[45] June 26, 1973

[54] TERTIARY AROMATIC AMINE ACCELERATORS IN DENTAL COMPOSITIONS

[75] Inventors: Rafael L. Bowen, Gaithersburg; Harold Argentar, Rockville, both of Md.

[73] Assignee: The United States of America as represented by the Secretary of the Department of Health, Education and Welfare, Washington, D.C.

[22] Filed: Feb. 2, 1971

[21] Appl. No.: 112,077

[52] U.S. Cl............ 32/15, 260/32.8 EP, 260/41 A, 260/41 B, 260/41 C, 260/41 AG, 260/45.8 A, 260/45.8 N, 260/45.85 A, 260/45.85 N, 260/45.9 R, 260/86.1 N, 260/86.1 E, 260/89.5 A, 260/837 R
[51] Int. Cl. .............................................. C08f 3/66
[58] Field of Search.................. 260/89.5 R, 89.5 A, 260/837, 86.1 R, 86.1 N; 32/15

[56] References Cited
UNITED STATES PATENTS

| | | | |
|---|---|---|---|
| 2,279,067 | 4/1942 | Shapiro......................... | 260/89.5 A |
| 2,347,567 | 4/1944 | Kresse........................... | 260/89.5 A |
| 2,558,139 | 6/1951 | Knock et al.................... | 260/89.5 R |
| 3,432,484 | 3/1969 | Welch............................ | 260/89.5 A |

Primary Examiner—Harry Wong, Jr.
Attorney—John S. Roberts and Norman J. Latker

[57] ABSTRACT

Direct dental filling materials and corresponding methods of treating human teeth utilizing known methacrylate dental polymer formers, peroxide catalysts, reinforcing fillers and unique tertiary aromatic amine accelerators with large substituents on the nitrogen atom and alkyl substituents on the aromatic ring at the 3 and 5 positions or the 4 position. Particularly preferred structures are N,N-disubstituted 3,5-xylidines, 4-methyl, and 4-tertiary butyl varieties.

When used in direct dental fillings, the compounds are uniformly non-volatile, at least three members of the group are crystallizable, and at least one member of the group serves dually as an accelerator and monomer.

12 Claims, No Drawings

TERTIARY AROMATIC AMINE ACCELERATORS IN DENTAL COMPOSITIONS

The present invention relates to certain improvements in methacrylate dental filling compositions which polymerize in situ to produce fillings in human teeth.

One difficulty in the present art is that most of the presently available composite restorative materials contain an amine-peroxide initiator system to polymerize methacrylate monomers, and it has been found that these amine-peroxide systems have certain disadvantages including a tendency to discolor the resin or composite filling material. Furthermore, in some cases, the working or hardening time may not be optimum for the dentist's requirements. Most important, however, is the fact that the methacrylate monomer compositions of the present art utilize low-molecular-weight tertiary aromatic amines that are systemically poisonous and able to penetrate skin and other tissues. There are varying degrees of pulpal inflammation following the use of these materials to restore defective teeth. Additionally, similar problems of inflammation occur in implant procedures, and there is a growing use of methacrylate "adhesives" to anchor titanium and other materials useful in bone repair in the body, as in polymeric implants and orthopedic restorations.

The tertiary aromatic amine accelerators which are the subject of the present invention fall within the general class exemplified by the following structure:

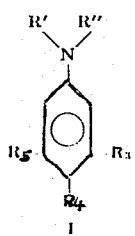

I where:
R' and R" are members selected from the class of alkyl; alkylaryl; alkylarylether; alkyl-N-phthalimido, and difunctional alkyl, alkylaryl, alkylether and alkylarylether groups wherein said alkyl groups are bonded directly to the nitrogen atom and wherein said alkyl groups contain from three to 20 normal carbon atoms between the nitrogen atom and the aryl, arylether or N-phthalimido groups, and wherein the second carbon atom from the nitrogen atom is —$CH_2$— or —CHOH—, and wherein R' and R" may be the same or different;

$R_3$, $R_4$ and $R_5$ are selected from the class of —H, —$C_nH_{2n+1}$ (n is 1 to 20) wherein the alkyl groups are normal or branched, and wherein at least one of $R_3$, $R_4$ and $R_5$ is $C_nH_{2n+1}$ and n is 1 to 20.

In the specific process of the present invention and as a preferred group of compounds particularly illustrating the invention, the compounds noted below in Formula II are illustrative:

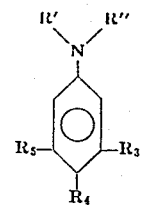

II where:
$R_4$ = H
$R_3$ and $R_5$ are each $CH_3$
R' and R" are each:

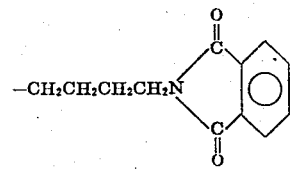

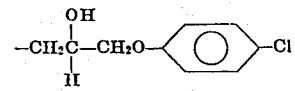

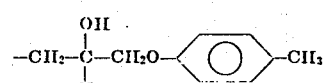

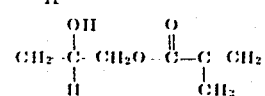

—the reaction product of the diglycidyl ethers of bisphenols.

Specific examples of structural formulas of representative compounds of the operating group for this invention are shown in Chart I, below.

In PBX, as shown on Chart I, n is any number from 1 to 10,000, and a preferred valuation of n is about 1 to 50. Furthermore, a specific example for n indicated an average molecular weight wherein n was about 3.7.

CHART I

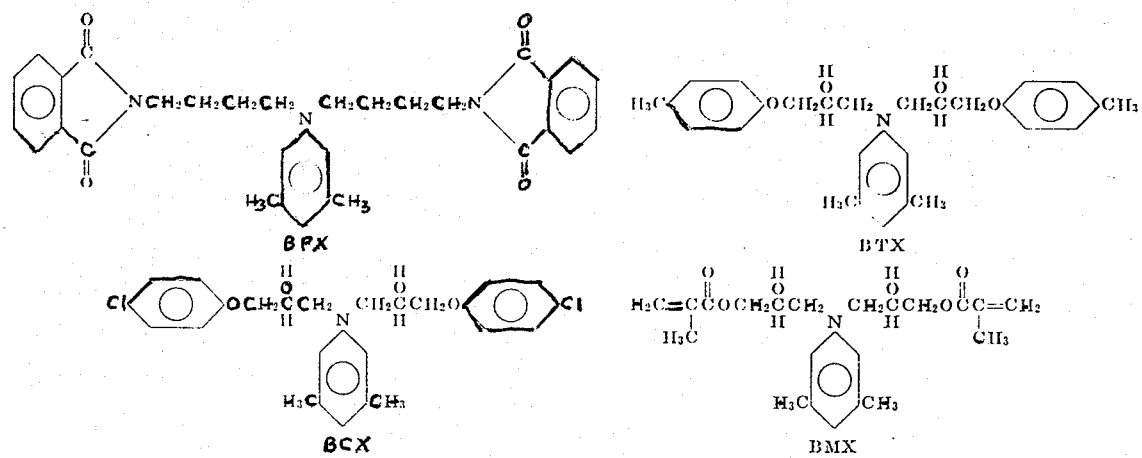

CHART 1 —Continued

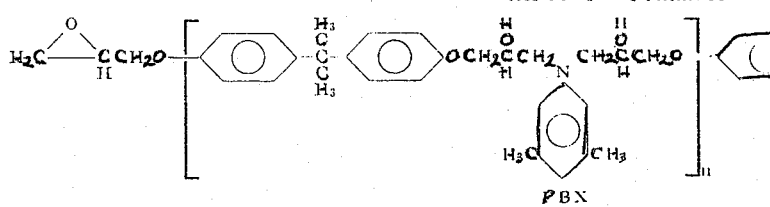
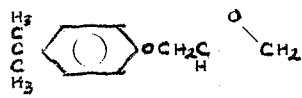

PBX

It has been found that resistance to discoloration appears to be primarily a function of the substituents on the aromatic ring of the amine and substitution at the 3, 4 and 5 positions appears to enhance this resistance to discoloration.

The rate of polymerization, which is important to dental practice, appears dependent upon both the alkyl substituents on the ring and the groups attached to the nitrogen. It has been further found that to satisfy the non-volatility requirement, the groups from the nitrogen should be of some length to give a total molecular weight of at least 400. Specific preferred compounds as to the aromatic ring substitutes are where $R_4$ is methyl, $R_4$ is tertiary butyl, and especially where the substituents $R_3$ and $R_5$ are methyl and $R_4$ is hydrogen.

Also, with respect to the substituents off the nitrogen in each case, the R' and R'' are symmetrical and the terminal moieties are selected from phthalimide, substituted aromatic ethers, methacrylate, and the reaction product of the diglycidyl ether of bisphenol A, according to the following partial formulas:

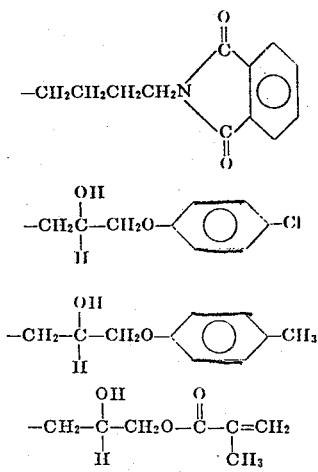

—the reaction product of the diglycidyl ether of bisphenol A.

PRIOR ART

U.S. Pat.:

No. 2,558,139 — Knock et al. (L. D. Caulk) — A dental material with tertiary phenyl ethanol amine catalyst with methyl methacrylate in the presence of peroxide and persulfate.

No. 2,744,886 — Protzman (Rohm and Haas) — the polymerization of acrylate esters with peroxide and a tertiary amine.

No. 2,833,753 — Lal (Justi and Sons) — N,N-dimethyl aniline which may be p-substituted with methyl or methoxy utilized as a polymerization catalyst for acrylate monomers.

No. 3,066,112 — Bowen (U.S.A.) — A reaction product of bisphenol with glycidyl methacrylate and glycidyl acrylate as a direct filling material.

Neither the patent art above, nor the literature cited below, teaches the compounds of the present invention together with their beneficial properties as dental materials previously cited.

Literature Citations

1. Caul, H. J., and Schoonover, I. C.: Color Stability of Direct Filling Resins, JADA 47:448–452, 1953.
2. Lal, J., and Green, R.: Effect of Amine Accelerators on the Polymerization of Methyl Methacrylate with Benzoyl Peroxide, *J Polymer Sci* 17:403–409, 1955.
3. Bowen, R. L.: Crystalline Dimethacrylate Monomers, *J Dent Res* 49:810–815, 1970.
4. Bowen, R. L., and Argentar, H.: Diminishing Discoloration in Methacrylate Accelerator Systems, *JADA* 75:918–923, 1967.
5. Kier, L.B., et al., *J Org Chem* 25:1865–1867, 1960.

An additional object of the present invention is the development of aromatic amine accelerators which obviate the difficulties found with prior lower-molecular weight aromatic amines which were found capable of skin penetration and thus in some cases systemically poisonous. It is believed that it is possible that the amine accelerators themselves present in the polymer used in direct filling resins and composites might be contributing to the pulpal irritation and inflammation.

Thus, in the present compounds, the increase in bulkiness of the molecule brought about by the substituents off the nitrogen in the amine accelerator serve to reduce tissue permeability. The rationale of the present compounds is to combine effective ring substituents such as alkyl at the 3, 4 and 5 positions with large, bulky nitrogen substituents of such a nature that they raise the molecular weight appreciably and also yield crystallizable compounds having melting points above room temperature. This latter feature allows for purification of these compounds by crystallization, and consequently production, quality control and storage stability are facilitated.

The crystallizable feature of the compounds allows for greater efficacy and ease in purification than is possible by distillation. Furthermore, these crystalline solid amines in many cases are more stable during storage than the volatile liquid amines such as are now commonly used as accelerators for polymerization.

With respect to the hardening times of the compounds utilized, tested at room temperature (22.5 ± 1° C), it was found that useful hardening times of about 3 to 4 minutes were obtained in the case of each of these aromatic amine accelerators using workable concentrations of amines, inhibitor and peroxide, and this compared favorably with commercial-type products. Also, the results indicated that optimum hardening times occurred with methyl substituents on the ring or with tertiary butyl in the 4 position.

It further appeared that the presence of the bulky groups off the nitrogen had only moderate hindrance on the rate of reaction and the significant other advantages of the compounds overweighed any detraction from this source. On the contrary, slower-acting but more efficient amines used at higher concentrations, it is believed, achieved a lower ratio of hardening time to working time.

With respect to discoloration, the compounds appeared to satisfy usual criteria. In one case, BPX, the compound itself was a bright yellow color. It is noted that such an accelerator would prove useful where its absorption in the blue and near ultra-violet could protect the plastic by absorbing blue light and ultra-violet light which tend to degrade the plastic.

It is to be noted that compound BMX containing terminal unsaturated linkages may also be considered as a monomer and it has a dual function as an accelerator and as a monomer. The advantage of this compound is that it enters into the polymer structure and it may be used by itself or with other monomers of the type that polymerize by free radical chain reaction and which can copolymerize with methacrylate esters. Since this compound is copolymerizable and becomes a part of the polymeric network, it cannot be exuded or leached out of the polymeric product.

The polymeric product PBX is especially non-volatile so that even at high temperature processing it would not be lost due to volatilization.

It is understood that the novelty of the present invention lies within the limits of the specific amines utilized in the decomposition of peroxides and thus in the accelerating of free radical polymerizations of any suitable monomers. While there may be numerous industrial applications that fall within the spirit and scope of this invention, the applications of these amines will be described and utilized in a setting of a direct dental filling composition. The remaining components may be conventionally selected. However, in order to elucidate and specify the remaining members of the composition, typical ingredients are set forth as follows:

THE MONOMERIC COMPONENTS

In general, the monomeric prepolymer or starting material may be selected from a suitable monomer or mixture of monomers such as the various esters of methacrylic acid, acrylic acid, unsaturated polyesters, and polymethacrylates. Examples of other monomers whose polymerization or copolymerization reactions are promoted by the amines of the present invention include, for example, all other methacrylates and acrylates, such as methyl methacrylate, ethyl methacrylate, higher methacrylates and acrylates and substituted methacrylates and acrylates. Preferred are dimethacrylates, such as those described below.

Preferred are the reaction products of glycidyl methacrylate and a bisphenol as described more fully in U.S. Pat. No. 3,066,112, Bowen, ante, and dimethacrylate derivatives of isomeric polyesters as described more fully in U.S. Pat. No. 3,539,526, Bowen.

THE PEROXIDE INITIATORS

Suitable initiators are the free radical polymerization initiators such as peroxides, e.g., benzoyl peroxide, phthaloyl peroxide, substituted benzoyl peroxides, acetyl peroxide, caproyl peroxide, lauroyl peroxide, cinnamoyl peroxide, acetyl benzoyl peroxide, methyl ethyl ketone peroxide, sodium peroxide, hydrogen peroxide, di-tert. butyl peroxide, tetraline peroxide, urea peroxide, etc., the hydroperoxides, e.g., cumene hydroperoxide, p-menthane hydroperoxide, di-isopropyl-benzene hydroperoxide, tert. butyl hydroperoxide, methyl ethyl ketone hydroperoxide, 1-hydroxycyclohexyl hydroperoxide-1, etc., the per compounds, e.g., ammonium persulfate, sodium perborate, sodium perchlorate, potassium persulfate, etc., ozone, ozonides, etc. The initiators may be used alone or in admixture with one another. Benzoyl peroxide is the preferred catalyst. Any suitable amount of the catalyst may be used, but in general the catalyst concentration that gives satisfactory results may be within the range of 0.1 and 2.0 percent by weight of the entire polymerizable mass.

REINFORCING FILLER ADDITIVES

In general, any suitable material which improves the formulation may be utilized as a filler. Currently, such a preferred material is fused silica used in conjunction with a silane keying agent. Cf. U.S. Pat. No. 3,066,112, Bowen, where the purpose of the silane keying agent is to form stable chemical bonds to both the polymer or resin and the included material. The fused silica particles are preferably fine enough to pass through a No. 325 sieve of the U.S. Standard sieve series. Also operable as fillers are such materials as aluminum oxide, crystalline quartz, and various siliceous glasses. Especially preferred as reinforcing fillers are particles of silica-containing glass or crystal that have been treated with a 3-methacryloxypropyl silane.

STABILIZING AGENTS

In some cases, in order to prevent premature polymerization of the composition prior to use, conventional stabilizing agents or polymerization inhibitors may be utilized. These include the monomethyl ether of hydroquinone, 2-methacryl-oxyethyl-p-hydroxy benzoate, dialkyl sulfides and preferably food-grade butylated hydroxy toluene. The utilization of such preservatives, however, is not in all cases necessary for the practice of the present invention.

ADHESION-PROMOTING AGENTS

For applications in preventive dentistry as well as in restorative dentistry and in industrial arts and sciences, adhesion-promoting agents may be used in conjunction with the present invention. Such adhesion-promoting agents are described in 3,200,142, Bowen, e.g., the reaction product of N-phenyl glycine and glycidyl methacrylate.

The compounds in the following Examples are structured and abbreviated as in Chart I above.

EXAMPLE 1

N,N-bis(4-phthalimidobutyl)-3,5-xylidine (BPX; Chart I)

This compound was prepared by combining 4.3 ml (4.0 gm, 0.033 mol) of 3,5-xylidine, 23.3 gm (0.082 mol) of N-(4-bromobutyl)phthalimide, 6.5 gm (0.077 mol) sodium bicarbonate, and 140 ml of distilled water in a 250 ml round bottom flask, and refluxing for about 18 hours. A yellow precipitate formed, which was recrystallized from ethanol and ethanol-water. The bright yellow crystals has a melting point of 119°–120° C. The yield of BPX was 86 percent of theoretical (based on the 3,5-xylidine).

Two grams of the compound were recrystallized from 100 ml cyclohexane yielding yellow needle-shaped crystals. These melted first at 58.5°–64.5°, and then on further heating, solidification slowly occurred again.

The resolidified compound finally melted at 120°–121.5°. The recrystallized compound (weighing about 0.5 gm) was dissolved in about 10 ml chloroform, and 28 ml hexane was added. The solution was evaporated down to about 10 ml. A yellow precipitate slowly formed having a melting range of 120°–122.5°, with no intermediate melting or phase change occurring and this precipitate was isolated and identified as BPX.

EXAMPLE 2

N,N-bis(3-p-chlorophenoxy-2-hydroxypropyl)—3,5-xylidine, F.W. 490, (BCX; Chart I)

This compound was prepared in a 500 ml 3-necked round bottom flask equipped with a dropping funnel, reflux condenser and heating source. To 15.4 ml (15 gm, 0.124 mol) of 3,5-xylidine was added 44 ml of methanol in the flask. Water was added to the stirred solution to the cloud point (when 40 ml of water had been added, the solution became slightly turbid). After the xylidine solution had been heated to refluxing, a solution of 50 gm (0.274 mol) of p-chlorophenyl-2,3-epoxypropyl ether dissolved in 200 ml of methanol (forming what appeared to be a nearly saturated solution) was added dropwise from a dropping funnel over a period of about 5 hours. The combined solutions were refluxed for an additional six hours with stirring. The solvents were then evaporated under partial vacuum, leaving an off-white solid. Since the reaction product would be expected to consist of three steroisomers (meso and d,l), the material was fractionally recrystallized from acetone yielding several fractions of white crystals, the total amounting to 62 percent of the theoretical yield (based on xylidine).

The impure material was boiled with 600 ml acetone forming a saturated solution, and allowed to cool slowly. A colorless precipitate (18.7 gm) formed having a melting point of 177°–180° C. The filtrate was evaporated down to about one-fourth of its original volume. About 1 gm of precipitate formed with a melting point of about 170° C. The filtrate was further concentrated by evaporation to one-half. Four gm of material with a melting point of 160°–166° C was obtained.

The solution was evaporated down to about 30 ml. On cooling, the solution became almost completely solid with little acetone remaining. The solid (14.6 gm) melted at 75°–85° C ("low-melting BCX" fraction).

The first-fraction material, melting at 177°–180° C (18.7 gm) was recrystallized from 1,000 ml of boiling acetone as described, yielding three fractions melting between 176.5° and 180° C which amounted to 15.9 gm or 85 percent of the original impure high-melting material. A small quantity that was more thoroughly dried had a melting range of 180°–181° C.

The low-melting fraction melting at 75°–85° C (14.6 gm) was dissolved in 150 ml of boiling methanol and filtered. Seventeen ml of water were added to produce a turbidity. Twenty-five ml of methanol were added and the turbid solution was filtered and then heated to boiling, producing a clear solution. On cooling, a precipitate formed, which, when dried, had a melting range of 122.5°–123.5° C. The precipitate was recrystallized from 250 ml 9:1 (vol:vol) methanol-water, giving 6.2 gm of material with a melting range of 126°–129° C after thorough drying.

EXAMPLE 3

N,N-bis(3-p-tolyloxy-2-hydroxypropyl)-3,5-xylidine, F.W. 450 (BTX; Chart I)

In a 500 ml, 3 necked round bottom flask equipped with a dropping funnel, reflux condenser and heating equipment, were mixed 15.4 ml (15 gm, 0.124 mol) of 3,5-xylidine, 45 ml methanol and enough water (40 ml) to just bring about a perceptible turbidity. A mixture of 41.3 ml (44.9 gm, 0.274 mol) of 1,2-epoxy-3-(p-methylphenoxy) propane and 200 ml of methanol were placed in the dropping funnel. After the xylidine solution had been heated to reflux temperature, the epoxy solution was added dropwise over a period of 2.5 hours, and reflux was continued for an additional hour. A colorless precipitate formed on cooling. Most of the solvents were removed and the crude product was divided into three portions.

The first portion (25.7 gm) of the crude material was recrystallized from 500 ml of a boiling 7:3 (vol:vol) acetone-water mixture. On cooling to room temperature 7.1 gm of material melting at 138°–142° C were obtained. This material was recrystallized in like manner yielding 5.2 gm material melting at 144.5°–146.5° C.

On recrystallization again, in the same manner, 4.9 gm of compound melting at 146.5°–148.5° C was obtained.

The second portion of the crude material (21.8 gm) was recrystallized three times from the three boiling filtrates (in the same sequence) used in the recrystallizations of the first portion of crude material, yielding 7.1 gm.

The third portion of crude material (26.6 gm) was treated in the same way as the second yielding 5.8 gm of material with a melting range of 105° to about 115° C.

The three filtrates were combined and solvent allowed to evaporate partially at room temperature and 12.5 gm of product were collected. Its melting range was 102.5°–106° C.

The total yield of all recrystallized fractions was 30.3 gm or 54 percent of theoretical based on 3,5-xylidine.

The first fraction (4.9 gm), melting at 146.5°–148.5° C was designated the high-melting BTX fraction.

The last fraction (12.5 gm), with a melting range of 102.5°–106° C was designated the low-melting BTX fraction.

EXAMPLE 4

N,N-bis(2,hydroxy-3-methacryloxypropyl)-3,5-xylidine, F.W. 405 (BMX; Chart I)

This was prepared in a 2,000 ml, 3-necked round bottom flask equipped with a stirrer, condenser, thermometer, and hot water bath. The following were added to the flask: 112 ml (109 gm, 0.90 mol) of 3,5-xylidine, 248 ml (266 gm, 1.87 mol) glycidyl methacrylate, 9.8 ml water, 0.571 gm of an acid-catalyzed condensation product of p-hydroxybenzoic acid and 2-hydroxyethyl methacrylate (MHB), 0.272 gm of di-t-butyl sulfide, and 0.206 gm of butylated hydroxytoluene (BHT). The latter three compounds were added to prevent (premature) polymerization of the methacrylate groups. The mixture was stirred at 70 ± 10° C for about 8 hours until the reaction appeared to be complete as evidenced by a plot of the refractive index against reaction time. When the index of refraction had reached a plateau, a small aliquot was mixed with reinforcing filler containing 0.52 percent benzoyl peroxide plus 0.85 percent lauroyl peroxide; the thin mix hardened in 2.0 minutes at room temperature. The rapid hardening gave supportive evidence that there was little if any residual primary or secondary aromatic amine remaining which would act as a free-radical polymerization inhibitor. The water was removed with vacuum, stirring and slight warming, leaving a clear, viscous yellow liquid having a pour point below room temperature and a refractive index $n_D^{23}$ of 1.528. The nominal yield was 98 percent; however, this yield may well be raised by the presence of unreacted starting materials. More of the stabilizers (polymerization inhibitors) were added (0.608 gm of MHB; 0.273 gm of di-t-butyl sulfide, and 0.665 gm of butylated hydroxy toluene), and the hardening time of this liquid mixed with the same powder was thus increased to about 9.5 minutes at room temperature.

The synthesis method described for BCX and BTX (Ex.2 and 3) could optionally be used and may be preferable in the synthesis of BMX, in that the dropwise addition of the epoxy reactant would decrease the probability of its homopolymerization, and increase the probability of obtaining crystallizable products.

EXAMPLE 5

The polymeric adduct (addition reaction product) of the diglycidyl ether of bisphenol A and 3,5-xylidine was prepared and designated PBX (Chart I). In a 1,000 ml round bottom flask equipped with a reflux condenser and heating mantel, 104.4 gm (0.31 mol) of the diepoxide D.E.R 332, 24.8 ml (24.2 gm, 0.20 mol) of 3,5-xylidine, and 500 ml of methanol were mixed, and two poly(tetrafluoroethylene) pellets were added (to prevent bumping). The mixture was refluxed for 12 hours, during which time the clear solution became turbid. After cooling and settling, the supernatant was decanted off and methanol was removed from the residue under partial vacuum, yielding a clear yellow amorphous product. This product (PBX) was soluble in acetone and in dimethacrylate monomers, and was used to evaluate hardening times and relative discoloration tendencies.

The PBX (136 gm) mixed with 62 gm of acetone, was further treated by partitioning with 207 gm hexane, the hexane phase being discarded. The resin was then extracted three times, each with 1,000 gm boiling water, and dried under partial vacuum, with continual air exchange, at about 200 mm Hg (26,600 N/m²) for 2 hours at 115° to 120° C. On cooling, the pBX was a clear, light-yellow, brittle, glassy solid, amounting to 80 percent of theoretical yield based on total starting reactants.

The molecular weight of this kind of polymeric amine can be altered at will by choice of the proportions of the primary aromatic amine (for example, 3,5-xylidine, p-toluidine, various 4-alkyl anilines, etc.) and the diepoxide (for example the diglycidyl ethers of bisphenol A, bisphenol F, halogenated bisphenols, and diphenolic acid). The diglycidyl ether can be in slight molar excess of the primary aromatic amine, or have at least one epoxy group for each —NH group of an aromatic amine, primary or secondary. If the aromatic amine is secondary, polyepoxides with more than 2 epoxy groups per molecule can be used. The preferred reactants are 3,5-xylidine and a slight molar excess of bisphenol A, as exemplified in Example 5.

What is claimed is:

1. A direct dental filling composition consisting essentially of a polymerizable methacrylate monomer, a peroxide catalyst, a filler, and an amine accelerator selected from the group consisting of

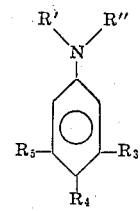

where
$R_4 = H$
$R_3$ and $R_5$ are each $CH_3$
$R'$ and $R''$ are each:

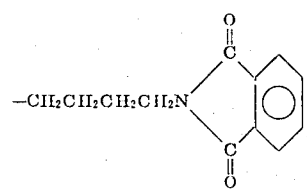

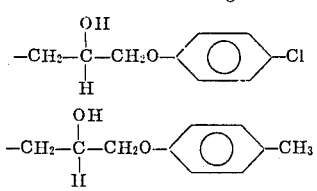

or

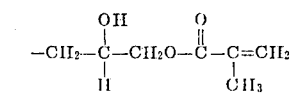

and the reaction product of the diglycidyl ether of bisphenol A with 3,5-xylidine conforming to the following structure:

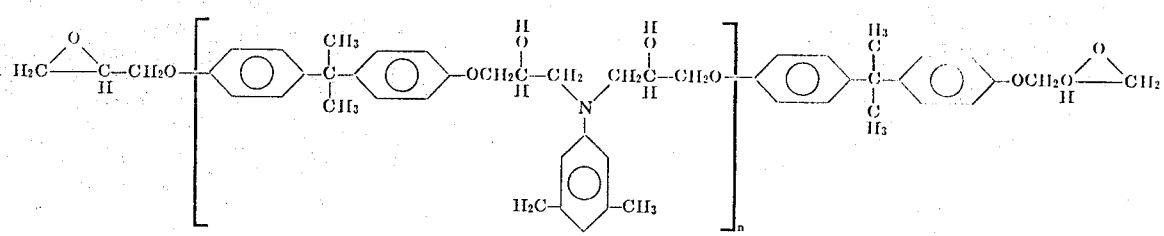

2. A direct dental filling composition according to claim 1 wherein the amine accelerator is such that $R'$ and $R''$ are each restricted to:

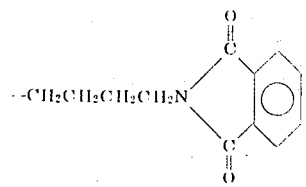

3. A direct dental filling composition according to claim 1 wherein the amine accelerator is such that R' and R'' are each restricted to:

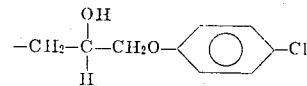

4. A direct dental filling composition according to claim 1 wherein the amine accelerator is such that R' and R'' are each restricted to:

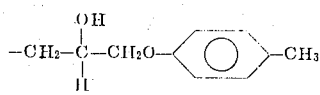

5. A direct dental filling composition according to claim 1 wherein the amine accelerator is such that R' and R'' are each restricted to:

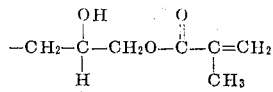

6. A direct dental filling composition according to claim 1 wherein the amine accelerator is restricted to the reaction product of 3,5-xylidine and the diglycidyl ether of bisphenol A.

7. A method of treating human teeth for filling and for restorative purposes which comprises contacting said teeth with a direct filling composition consisting essentially of methacrylate monomer, a peroxide catalyst, a filler and an amine accelerator selected from the group consisting of

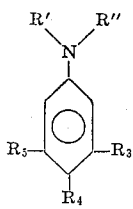

where:
R₄ = H
R₃ and R₅ are each CH₃
R' and R'' are each:

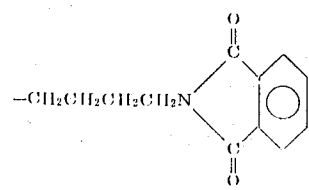

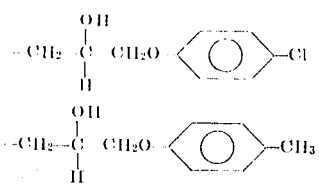

or

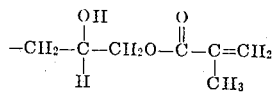

and
the reaction product of the diglycidyl ether of bisphenol A with 3, 5-xylidine conforming to the following structure:

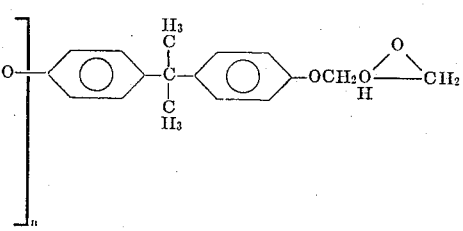

8. A method of treating human teeth according to claim 7 wherein the amine accelerator is such that R' and R'' are each restricted to:

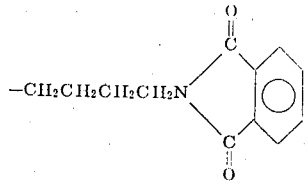

9. A method of treating human teeth according to claim 7 wherein the amine accelerator is such that R' and R'' are each restricted to:

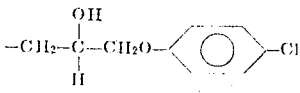

10. A method of treating human teeth according to claim 7 wherein the amine accelerator is such that R' and R'' are each restricted to:

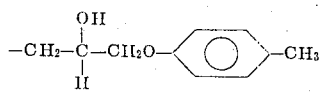

11. A method of treating human teeth according to claim 7 wherein the amine accelerator is such that R' and R'' are each restricted to:

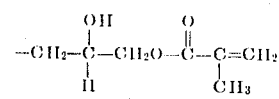

12. A method of treating human teeth according to claim 7 wherein the amine accelerator is restricted to the reaction product of 3,5-xylidine and the diglycidyl ether of bisphenol A.

* * * * *